…

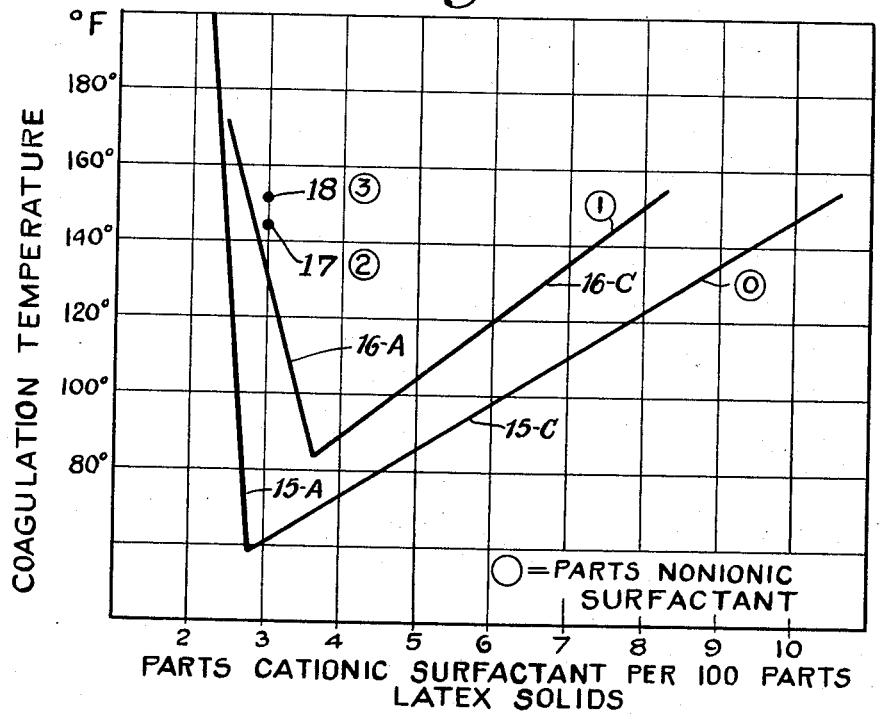
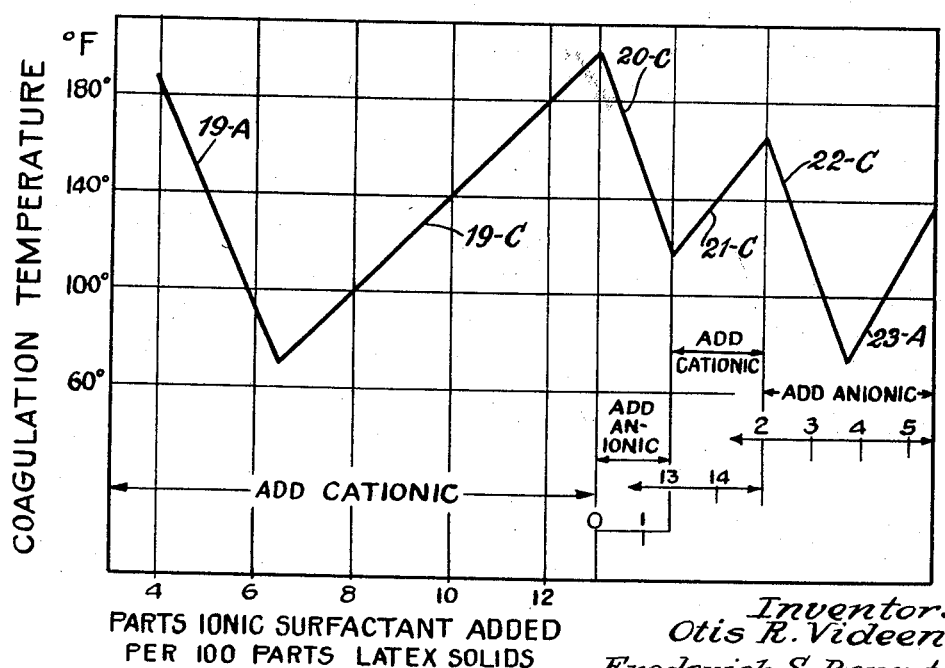

United States Patent Office 2,912,350
Patented Nov. 10, 1959

2,912,350

LATICES AND FABRICS THEREFROM

Otis R. Videen and Frederick S. Bergstrom, Cloquet, Minn., assignors to Wood Conversion Company, St. Paul, Minn., a corporation of Delaware Application August 28, 1956, Serial No. 606,701

28 Claims. (Cl. 117—103)

The present invention relates generally to aqueous latex dispersions and to producing and using such dispersions which are subject to coagulation by heat within a selected range of temperatures. It relates particularly to impregnating porous bodies with aqueous latex dispersions and coagulating the solids thereof within the body by application of heat, preliminarily to the drying out of the residual water.

Commercial latices to which the present invention relates are those of natural rubber, so-called synthetic rubbers, and the organic polymers or elastomers having properties similar to rubber.

The latex particles are essentially water-insoluble materials, and have the property of drying from aqueous dispersion to form rubbery or elastic films. In the art, they have been variously referred to as rubbery binders (No. 2,564,882), elastomeric resins (No. 2,637,095) and film-forming elastomers (No. 2,543,718). Typical ones are natural rubber, elastoprenes or butalastics including rubbery copolymers, such as butadiene-acrylonitrile, butadiene-styrene, butadiene-vinyl chloride, butadiene-methyl pentadiene, butadiene-isoprene, butadiene-styrene-methyl methacrylate, butadiene-styrene-acrylonitrile; polymers, such as those of butadiene, styrene and isoprene; and rubbery chloroprene polymers, and rubber-like polymers of acrylic-acid esters including acrylic acid itself and methacrylic acid.

Such latices are presently provided commercially in concentrated form as dispersions in water at a high content of solids in the vicinity of 50% more or less. However, they are commonly used at lower dilutions after adding water. Because of the high commercial concentration in latex solids, they are required to be well stabilized against coagulation. Stabilization is most commonly provided by a content of anionic surfactant of a kind having dispersing or stabilizing properties, the anionic surfactants having, in general, greater stabilizing property than the nonionic and cationic surfactants. The commercially stabilized latices are thus so well anionically stabilized that in uses thereof at lower dilution in water they are resistant to coagulation by heat at processing temperatures at which it is desired that coagulation shall have already been effected at a lower temperature. For example, fabrics or fiber products impregnated or coated with a diluted commercial latex dispersion may be heated at temperatures up to the boiling point of about 212° F. without coagulating the latex. Drying a fabric impregnated with a non-substantive aqueous latex dispersion which is resistant to coagulation at the drying temperature of the processing induces migration of the latex particles to an extent such as other conditions permit it. To minimize or prevent migration of latex particles, blocking agents are employed. These may be dispensed with when the latex may be coagulated by heat before appreciable drying and hence before migration has occurred.

It is, therefore, an object of the present invention to convert commercial high solids-content latices into modified aqueous dispersions which will coagulate at a selected temperature or within a selected range of temperatures.

It is a particular object of the invention to counteract the stabilizing effect of at least a part of the original latex stabilizer.

It is also a particular object to change the stability of a latex dispersion to impart the property of coagulation by heat at a predetermined temperature or range of temperatures.

It is also an object of the invention to apply a heat-coagulable aqueous latex to solid material and by applying heat, coagulate the latex solids prior to volatilizing the residual water.

It is a special object of the invention to impregnate porous bodies with a heat-coagulable aqueous latex and by applying heat, coagulate the latex solids within the pores of the body prior to volatilizing the residual water, and thereby prevent migration of latex particles during drying.

Various other and ancillary objects and advantages of the invention will become apparent from the following description and explanation of the invention as given hereinafter with reference to the accompanying drawing, in which:

Fig. 3 shows a series of anionic latices to which from zero to various amounts of nonionic surfactant have been first added, and then the lowering of the coagulation temperature by adding cationic surfactant to the point of eliminating the negative charge and creating a positive charge as cationic latices.

Fig. 4 is a graph showing the effect on an anionic latex containing nonionic surfactant by adding cationic surfactant to create a cationic latex, lessening the cationic character by adding anionic surfactant, then increasing the cationic character by adding cationic surfactant, then adding anionic surfactant to reverse the charge and provide again an anionic latex.

Figure 1:
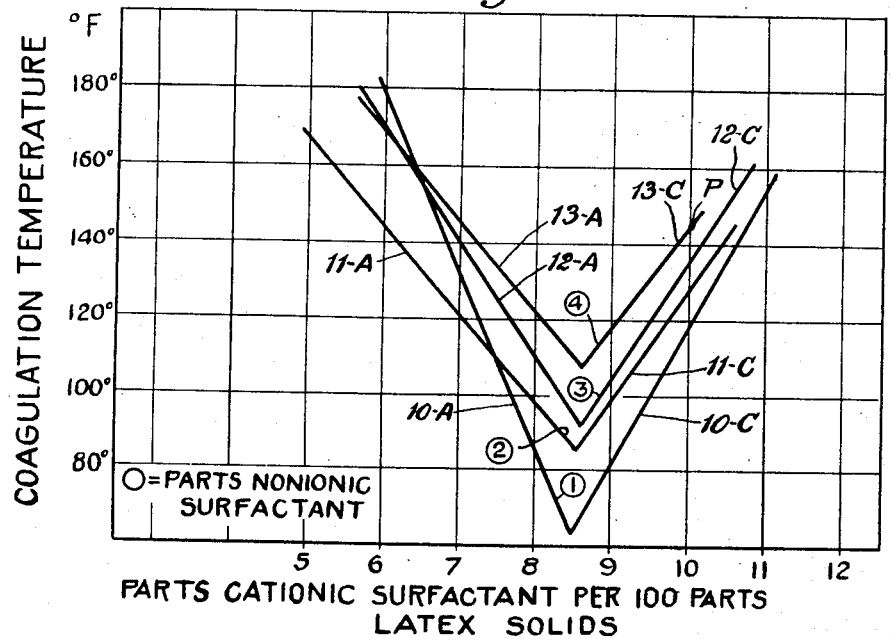
Fig. 1 is a series of graphs showing the addition of cationic surfactant to specimens of anionic latex containing non-ionic surfactant to the point of eliminating the negative charge and reversing it to a positive charge as a cationic latex.

Surfactants are of three types: anionic, nonionic, and cationic, hereinafter referred to for convenience, as AS, NS and CS. Of these, only the NS ones do not ionize. The NS ones are compatible with the other two, but the AS and the CS are opposites and mutually incompatible. In being opposites, the fatty portion of the molecule is in the anion of the AS, and in the cation of the CS. "Incompatibility" is by some referred to as "neutralization" in the sense that a given amount of a particular ionic surfactant may have its effect gradually nullified or counteracted by an increasing addition to it of an opposite ionic type. Thus, in a sense, CS neutralizes AS, and AS neutralizes CS.

It is immaterial to the present invention whether this effect is a stoichiometric one or some one or more of other phenomena. In the present description, it is shown how one of the ionic surfactants may be used in an increasing amount to counteract the stabilizing effect in aqueous latices of a given amount of an opposite type of ionic surfactant.

Surfactants are available in literally hundreds of chemical forms. Each has its own particular combination of properties to stabilize emulsions, to stabilize dispersions, and to provide wetting action. Each property may vary in degree over a wide range. Those surfactants which ionize have properties which in many cases vary according to the pH of the medium in which the effect is exerted. Consequently, the selection of a most effective surfactant for a given function is predetermined by the property or properties for which its use is desired, by the pH of the medium to contain it, and the concentration of it which is permissible or desired for many reasons including economic ones.

For example, when a latex is to be used for impregnating fibrous bodies, wetting power is desirable, and surfactant may be chosen not only for its stabilizing property but also for its wetting power. Accordingly, the present invention depends upon relationships of the three types of surfactants as one or more of them are present in aqueous latex dispersions.

To illustrate the effect of varying the usage of nonionic surfactant and of neutralizing surfactant, a series of formulations using a constant content of a butadiene-styrene copolymer (hereinafter identified as L–1 in its commercial form) illustrates the invention. This latex is stabilized with anionic surfactant, giving the particles a negative charge, as evidenced by migration to the anode of an electrolytic cell.

The present invention is based upon the discovery that the coagulation temperature (CT) may be moved in either direction on the temperature scale by changing the surfactant content. In general, in a given dispersion containing only an ionic surfactant, the coagulation temperature may be raised by adding more of the same ionic surfactant, and lowered by adding the opposite ionic surfactant. In so neutralizing the initial surfactant, when a point is reached in going down on the temperature scale at which the latex coagulates, this point is referred to as the minimum coagulation temperature (MCT).

When NS also is present, the minimum coagulation temperature is elevated in the direction of the increasing content of NS. Thus, a dispersion containing originally only AS may be additionally stabilized by NS in quantity to elevate both the CT and the MCT. Then, at temperatures below MCT, an anionic dispersion may be changed to a cationic one by adding CS, and then back again to an anionic dispersion by adding AS. In the same way, an original cationic dispersion, supplemented by NS to elevate the MCT, may be rendered anionic by adding AS at temperatures below its MCT and again rendered cationic by adding CS.

The particles in an anionic dispersion in an electrolytic cell move to the anode and those of a cationic dispersion move to the cathode. When an original anionic dispersion is rendered cationic by adding CS, as described above, the particles migrate as aforesaid. It is the ionic surfactant which imparts the positive (cationic) or negative (anionic) charge to the particles which charge predetermines the direction of migration.

The effects above described are illustrated by coagulation temperature lines in Fig. 1, using anionic L–1.

In Fig. 1, the temperatures of coagulation are plotted vertically against added amounts of CS plotted horizontally. There are four sets in a series all having initially the same content of AS and varying in content of NS, each set having a constant content of NS. The observed temperatures form nearly straight lines, and straight lines have been drawn better to illustrate the effect. The plots show V-shaped temperature lines for each of the four sets designated on the left leg as 10–A, 11–A, 12–A and 13–A, and on the right leg as 10–C, 11–C, 12–C and 13–C. The V-graphs 10 through 13 represent, respectively, increasing amounts of added NS in the series. The down trend of the –A lines results from increasing the added amount of CS. As more CS is added, a corresponding amount of AS of the original commercial latex is nullified as to its stabilizing effect, thus lowering the CT. This effect continues until the stabilizing effect of all the AS is nullified, and at this point the added nonionic surfactant is the effective stabilizer, and the more of it that is present, the higher is the said MCT represented by the vertices of the V-graphs.

On the –A lines of the V-graphs, there remains AS in the dispersion, and hence the dispersions exhibit anionic activity, supplemented by the presence of NS. Along the –A lines, every added increment of CS not only loses its own stabilizing effect, but it also nullifies the effect of a corresponding incremental amount of AS. However, at the end points, or vertices, these incremental losses and nullifications cease, and thereafter each added increment of cationic surfactant exerts its stabilizing effect accumulatively, thus elevating the CT. As a consequence, the dispersions along the –C lines exhibit cationic activity supplemented by the presence of the nonionic surfactant. The –A lines illustrated do not nest over their entire extent, but only in the region of their lower portions, where from a major portion to substantially all of the AS has been nullified as a stabilizer. All four –A lines nest after 90% of the AS is neutralized, and all –A lines except 11–A nest after about 76% of the AS is neutralized.

In establishing the series of Fig. 1, the commercial latex L–1 is diluted to a standard content by weight of 5% latex solids, and, therefore, each member of the series has a constant $k$-% content of the anionic surfactant which is present in the original commercial concentrate identified as having 48% latex solids. The four sets of the series vary in content of $x$-% NS. The individual members of each set are then varied in the $y$-% content of added CS.

The NS is first added, then the CS, and then water is added to a final standard dilution of 5% latex solids at a pH of 9.1. The dispersions in test tubes are placed in a cool water bath which is slowly and gradually heated. The temperature of the bath at the time of coagulation is then recorded and is reported in Table I below as the basis of Fig. 1.

TABLE I
[Percent based on latex solids.]

| Example | Graph | $x=$ percent NS | $y=$ percent CS | °F. |
|---|---|---|---|---|
| 1 | 10–A | 1 | 6 | 179 |
| 2 | 10–A | 1 | 7 | 138 |
| 3 | 10–A | 1 | 8 | 83 |
| 4 | 10–C | 1 | 9 | 78 |
| 5 | 10–C | 1 | 10 | 106 |
| 6 | 11–A | 2 | 6 | 140 |
| 7 | 11–A | 2 | 7 | 124 |
| 8 | 11–A | 2 | 8 | 98 |
| 9 | 11–A | 2 | 8.25 | 92 |
| 10 | 11–C | 2 | 8.5 | 84 |
| 11 | 11–C | 2 | 8.75 | 88 |
| 12 | 11–C | 2 | 9 | 96 |
| 13 | 11–C | 2 | 10 | 128 |
| 14 | 12–A | 3 | 6 | 172 |
| 15 | 12–A | 3 | 7 | 134 |
| 16 | 12–A | 3 | 8 | 114 |
| 17 | 12–C | 3 | 9 | 104 |
| 18 | 12–C | 3 | 10 | 135 |
| 19 | 13–A | 4 | 6 | 170 |
| 20 | 13–A | 4 | 7 | 139 |
| 21 | 13–A | 4 | 8 | 123 |
| 22 | 13–C | 4 | 9 | 118 |
| 23 | 13–C | 4 | 10 | 144 |

NS=N–2 (later identified herein).
CS=C–1 (later identified herein).

Figure 2:
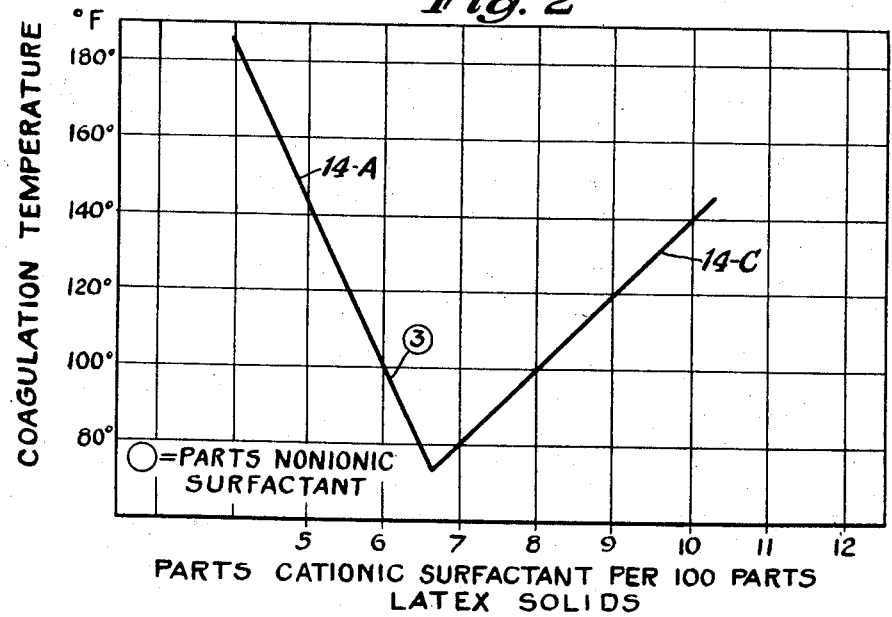
Fig. 2 is a graph showing another example similar to those in Fig. 1.

In Table II, data for a similar V-graph (see Fig. 2) are shown, using the same conditions, but at a pH of 9.3, with but one usage of the same NS (N–2) and varying uses of a different CS, identified later herein as C–8.

TABLE II
[Percent based on latex solids.]

| Example | Graph | $x=$ percent NS | $y=$ percent CS | °F. |
|---|---|---|---|---|
| 24 | 14–A | 3 | 5 | 144 |
| 25 | 14–A | 3 | 6 | 96 |
| 26 | 14–C | 3 | 7 | 80 |
| 27 | 14–C | 3 | 8 | 100 |
| 28 | 14–C | 3 | 9 | 120 |

NS=N–2.
CS=C–8.

*Example 29.—Extension of V-graph 13 of Fig. 1.*—To illustrate that a cationic dispersion produced by adding CS to an anionic dispersion may have its CT elevated and then lowered, a composition corresponding to the point P in V-graph 13 of Fig. 1 (CT=144° F.) was modified by adding more C-1 up to a content of 14% based on latex solids. This resulted in a CT above 200° F. not determined.

*Example 30.*—To Example 29 was then added 2% (based on latex solids) of AS, identified as A-1, and the CT was lowered to 117° F.

*Example 31.—Conversion of original cationic dispersion to anionic dispersion.*—A commercial cationic (L-6) dispersion identified as Neoprene Cationic Latex Type 950, made by E. I. du Pont de Nemours, as a dilution to 5% solids content was tested electrolytically to ascertain that it migrated to the cathode. To it, on the basis of latex solids, was added 6% of N-2 and then 3.3% of A-1, resulting in a CT of 135° F. and cationically charged particles.

*Example 32.*—To another specimen of Neoprene 950 (L-6) diluted to 5% solids content was added on the basis of latex solids 10% of N-2 and then 10% of A-1. This resulted in anionically charged particles and a CT of 176° F.

To commercial latices diluted to 5% solids content is added on the basis of solids the percentages of surfactants indicated in Table III, which includes Examples 29 to 32 given above.

TABLE III

| Example | Latex | NS | CS | AS | CT, °F. | Result |
|---|---|---|---|---|---|---|
| 29 | L-1 | 4.0% N-2 | 14.0% C-1 | | >200 | Cationic. |
| 30 | L-1 | 4.0% N-2 | 15.0% C-1 | 2.0% A-1 | 117 | Do. |
| 31 | L-6 | 6.0% N-2 | | 3.3% A-1 | 135 | Do. |
| 32 | L-6 | 10.0% N-2 | | 10.0% A-1 | 176 | Anionic. |
| 33 | L-1 | 3.5% N-2 | 11.5% C-1 | | 108 | Cationic. |
| 34 | L-1 | 3.0% N-2 | 6.5% C-1 | | 146 | Anionic. |
| 35 | L-1 | 5.0% N-2 | 15.0% C-1 | | >200 | Cationic. |
| 36 | L-6 | 6.0% N-2 | | 4.0% A-1 | 112 | Do. |
| 37 | L-6 | 10.0% N-2 | | 10.0% A-1 | 176 | Anionic. |

The foregoing illustrates the use of latices to which NS has been added. When NS is not added, small additions of a neutralizing ionic surfactant have more pronounced effects as measured by lowering the CT. This is illustrated in Fig. 3.

The same kind of latex as used for Fig. 1, but a different shipment thereof, was neutralized with cationic C-12 (Ethomeen S/15). This is highly ionized and active at a pH of 6.1. In using it, the C-12 is added and then acid is added to attain a pH of 6.1. The latex is adjusted to 5% latex solids for determining the CT.

Fig. 3 is a resulting plot of CT against percent of C-12, based on latex solids.

Graph 15-A shows a sharp drop in CT with small additions of the CS; and graph 15-C shows continued addition of the same CS creating a cationic latex.

By adding small amounts of NS, the drop in CT is less with addition of CS, as shown by graphs 16-A and 16-C, like V-graph 15, but with a previous addition of one part of NS (N-2) per 100 parts of latex solids. Points 17 and 18 show, respectively, the effect of increasing the parts of NS to 2 and 3. Table IV tabulates the data for Fig. 3.

TABLE IV

| Example | Graph | $x=$ percent NS | $y=$ percent CS | °F. |
|---|---|---|---|---|
| 38 | 15-A | 0 | 2.25 | 200 |
| 39 | 15-A | 0 | 2.75 | 70 |
| 40 | 15-C | 0 | 6.0 | 95 |
| 41 | 15-C | 0 | 7 | 114 |
| 42 | 15-C | 0 | 8 | 126 |
| 43 | 15-C | 0 | 9 | 140 |
| 44 | 15-C | 0 | 10 | 145 |
| 45 | 16-A | 1 | 2.75 | 152 |
| 46 | 16-A | 1 | 3 | 130 |
| 47 | 16-A | 1 | 3.5 | 96 |
| 48 | 16-C | 1 | 4.0 | 87 |
| 49 | 16-C | 1 | 4.5 | 94 |
| 50 | 16-C | 1 | 5.0 | 100 |
| 51 | 16-C | 1 | 6.0 | 125 |
| 52 | 16-C | 1 | 7.0 | 145 |
| 53 | 17 | 2 | 3 | 144 |
| 54 | 18 | 3 | 3 | 151 |

To show the effect of the so-called ionic neutralization between AS and CS, Fig. 4 shows how an anionic latex may be changed to cationic and back to anionic, and as a cationic latex, rendered more so, then less so, then more so, then less so and back to an anionic latex.

The said latex L-1 with 3% (based on latex solids) of NS (N-2) is variously changed by adding either C-8 or A-2. In Fig. 4, graph 19-A shows the full neutralization of AS in the NS-stabilized latex by adding C-8. The addition of the latter is extended to form cationic latex of graph 19-C. Then part of the C-8 is neutralized by adding A-2 along graph 20-C. Then more C-8 is added to raise the CT on graph 21-C. Then CT is lowered again as graph 22-C by adding A-2 to the point of completely neutralizing the C-8, and then beyond to recover an anionic latex on graph 23-A. The same results have been found in substituting A-3 for A-2, these being similar in chemical constitution. Table V shows the data for Fig. 4.

TABLE V $x=3\%$ NS (N-2)

pH=9.3

| Example | Graph | $y=$ percent CS | $y=$ percent AS | °F. |
|---|---|---|---|---|
| 55 | 19-A | 4 | | 186 |
| 56 | 19-A | 5 | | 144 |
| 57 | 19-A | 6 | | 96 |
| 58 | 19-C | 8 | | 100 |
| 59 | 19-C | 9 | | 120 |
| 60 | 19-C | 10 | | 140 |
| 61 | 19-C | 13 | | 200 |
| 62 | 20-C | | 0.5 | 170 |
| 63 | 20-C | | 1 | 144 |
| 64 | 20-C | | 1.5 | 118 |
| 65 | 21-C | 15 | | 168 |
| 66 | 22-C | | 2 | 140 |
| 67 | 22-C | | 3 | 90 |
| 68 | 23-A | | 4 | 100 |
| 69 | 23-A | | 5 | 120 |

Table V shows the greater power of AS to stabilize compared to CS. Cationic dispersions are less stable and in the absence NS, it is very difficult to lower the CT appreciably by adding AS, without effecting localized coagulation. When NS is present, this is readily avoided as indicated by the graphs 20–C and 22–C.

There is an important difference between a latex exhibiting anionic activity and one exhibiting cationic activity, and this difference is the reason that most commercially available latices are anionically stabilized. It is well known that cationic emulsions and dispersions are substantive to many surfaces. As a result, mere contact of the cationic composition with a receptive surface frequently results in deposition of the cationic agent on the surface. This destabilizes an emulsion or dispersion and effects precipitation of the emulsified or dispersed material. Broadly stated, the undesired effect, with or without such precipitation, is alteration of the liquid composition.

Accordingly, in the case of a latex exhibiting cationic activity, the content of cationic agent in the bath is lowered by repeated contact with a receptive surface. When a fiber mat is run continuously through a bath to impregnate it, the mat selectively depletes the bath in content of cationic agent. The residual bath is thus rendered less stable. In doing this, it has been found that the coagulation temperature of the residual latex drops as this depletion continues, corresponding to a downward movement on the –C lines of the V-graphs.

When such a latex exhibiting cationic activity is used otherwise than by such depleting practices, as for example, when it is coated or sprayed onto a surface, its coagulation temperature may be predetermined or controlled by practice of the present invention.

Accordingly, when an aqueous latex is to be used as a bath for impregnating material such as a fiber mat, and when it is desired to maintain a constant composition of the bath, a latex is used which exhibits anionic activity.

To illustrate the substantive character of cationic dispersions, reference is made to Example 35 which coagulates at an undetermined temperature above 210° F. A fabric of 50% wool and 50% cotton was impregnated with the latex in amount to provide 10 parts of latex solids to 100 parts of dry fiber. The impregnated mat was dried by exposure to an atmosphere at 225° F. During such drying, the mat, of course, while not dry remained at about 210° F. No migration of latex occurred. This means that the latex either is substantive to the cotton or the wool or both, or that it coagulated. The same latex without any addition of CS was impregnated into a mat of the same character and dried in the same way. It migrated. This shows that the cationically active latex was substantive to the fibers.

Broadly, the invention is directed to compounding an aqueous latex dispersion so that it will coagulate by heat at below a predetermined temperature or within a range of temperatures. To illustrate, when a latex dispersion does not coagulate at or below a predetermined temperature, for example, one at which it is to be dried of its water content, it is modified by practice of the present invention to coagulate at below that predetermined temperature. The coagulation temperature may be predetermined by the composition, and where the latex must coagulate above a working or application temperature and below said predetermined dry temperature, the precise temperature of coagulation may not be important, so long as it is within the range from the working temperature to the drying temperature. Thus, considerable latitude in compounding is available in such cases.

By adding increments of neutralizing ionic surfactant to a latex dispersion stabilized at least in part by an opposite ionic surfactant, each increment becomes ineffective as stabilizer and it also counteracts the stabilizing effect of an increment of the receiving ionic surfactant. This lessens the stability of the dispersion to heat, as measured by the temperature at which it coagulates. In gradually adding such increments, the latex may coagulate at the working temperature. When this is subject to occur in a particular combination of materials, it may be prevented by the following practice:

Before adding neutralizing ionic surfactant, there is added a sufficient quantity of NS to stabilize the dispersion at the temperature where it would otherwise coagulate as the "neutralization" proceeds. In other words, it has been found that in the presence of a stabilizing content of NS in an aqueous latex dispersion containing stabilizing ionic surfactant, the latter may be neutralized by an opposite ionic surfactant up to the point of extinguishing its effect, without coagulation at a chosen temperature upwardly from the working temperature, and the amount of NS may be increased or decreased, respectively to raise or to lower the coagulation temperature.

In the following examples, various materials employed are designated by symbols identified in the following:

Key to materials

Symbol: Commercial identification; source; chemical identification; characteristics.

Latex:
    L–1—Dow Latex 546–C.
        Dow Chemical Co., Midland, Michigan.
        Butadiene-styrene copolymer.
        48% solids, stabilized with anionic surfactant.
    L–2—Nitrex 2614.
        Naugatuck Chemical Co., Naugatuck, Conn.
        Butadiene-acrylonitrile.
        38.4% solids, stabilized with anionic surfactant.
    L–3—Chemigum 235 AHS.
        Goodyear Tire & Rubber Co., Inc., Akron, Ohio.
        Butadiene-acrylonitrile.
        43.4% solids, stabilized with ammonium soap as anionic surfactant.
    L–4—6–E–3 Buna N latex.
        General Latex & Chemical Corp., Cambridge, Mass.
        Butadiene-acrylonitrile.
        42% solids, stabilized with anionic surfactant.
    L–5—Natural rubber latex.
        General Latex & Chemical Corp., Cambridge, Mass.
        59.2% solids, naturally anionically stabilized.
    L–6—Neoprene Cationic Latex Type 950.
        E. I. du Pont de Nemours, Wilmington, Delaware.
        50% solids.

Nonionic surfactant:
    N–1—BRIJ 35.
        Atlas Powder Company, Wilmington, Delaware.
        Polyoxyethylene lauryl alcohol.
        Liquid.
    N–2—Nonic 218.
        Sharples Chemical Company, Philadelphia, Pa.
        Polyethylene glycol-tertiary-dodecylthioether.
        Liquid.
    N–3—Triton X–100.
        Rohm & Haas Company, Philadelphia, Pa.
        Alkyl-aryl polyether alcohol.
        Liquid.
    N–4—Igepal CO.
        Antara Chemicals, New York, N.Y.
        Alkyl phenoxy polyoxyethylene ethanol.
        Liquid.

Cationic surfactant—Source APC=Atlas Powder Company, Wilmington, Delaware; source OOCC=Onyx Oil & Chemical Company, Jersey City, New Jersey; source ACC=Alrose Chemical Company, Providence, Rhode Island; source A & Co.=Armour & Company, Chemical Division:

C–1—Atlas G–202.
    APC.
    Ethyl-dimethyl-octadecyl-ammonium - ethyl-hydrogen-phosphite.
    100% active—paste.

C–2—Atlas G–271.
    APC.
    N-soya-N-ethyl-morpholinium-ethosulfate.
    35% active—liquid.

C–3—Atlas G–263.
    APC.
    N-cetyl-N-ethyl-morpholinium-ethosulfate.
    35% active—liquid.

C–4—Ammonyx G.
    OOCC.
    Cetyl-dimethyl-benzyl-ammonium chloride.
    98% atcive—paste.

C–5—Onyxsan S.
    OOCC.
    Alkyl-imidazoline-derivative.
    50% active—paste.

C–6—BTC—50%.
    OOCC.
    Alkyl-dimethyl-benzyl-ammonium-chloride.
    50% active—liquid.

C–7—Quaternary C.
    ACC.
    Imidazolinium-chloride (M.W.=370).
    100% active—liquid.

C–8—Quaternary O (same as C–7 with M.W.=450).
    ACC.
    Imidazolinium-chloride.
    100% active—liquid.
    Amine C.
    ACC.
    Imidazoline (M.W.=276).
    100% active—paste.

C–10—Hyamine 2389.
    Rohm & Haas Company, Philadelphia, Pa.
    Alkyl - tolyl - methyl - trimethyl ammonium chloride.
    100% active—liquid.

C–11—Ethomeen S/12.
    A & Co.
    Tertiary amine, as condensation product of primary fatty amine with 2 ethylene oxide molecules.
    Liquid. 100% active.

C–12—Ethomeen S/15.
    A & Co.
    Tertiary-amine of one alkyl radical of soybean fatty acid and two polyoxyethylene groups, together totaling 5 ethylene oxide molecules.
    Liquid. 100% active.

C–13—Armac C.
    A & Co.
    Acetate salt of mixed primary alkyl amines (mean molecular weight of 200) varying from 8 to 18 carbon atoms.
    100% active—solid.

C–14—Arquad 12.
    A & Co.
    N-alkyl-trimethyl-ammonium chloride (90% dodecyl, 9% tetradecyl).
    33% active—liquid.

Anionic surfactant:

A–1—N.S.A.E.
    OOCC.
    Sodium alkyl naphthalene sulfonate.
    85% active—powder.

A–2—Nekal BX–78.
    General Dyestuff Corp.
    Sodium alkyl-naphthalene sulfonate.
    80% active—powder.

A–3—Blankol N.
    General Dyestuff Corp.
    Sodium salt of sulfonated naphthalene condensate.
    80% active—powder.

In one set of examples, the commercial latex L–1 at a dilution of 5 parts latex solids per 100 parts of aqueous dispersion was variously compounded with NS and CS with pH adjustment as given in Table VI, to predetermine coagulation temperatures.

TABLE VI

| Example | Percent CS [1] | Percent NS [1] | pH | Coag. Temp., °F. |
|---|---|---|---|---|
| 70 | 7.0% C–1 | 2.5% N–2 | 9.1 | 132 |
| 71 | 6.0% C–2 | 4.0% N–2 | 6.2 | 166 |
| 72 | 7.0% C–3 | 3.0% N–2 | 6.8 | 151 |
| 73 | 6.0% C–4 | 4.0% N–2 | 9.4 | 115 |
| 74 | 10.0% C–5 | 3.0% N–2 | 6.3 | 142 |
| 75 | 7.5% C–6 | 4.5% N–2 | 9.4 | 150 |
| 76 | 7.0% C–7 | 0.5% N–2 | 9.2 | 140 |
| 77 | 4.5% C–8 | 3.0% N–2 | 9.3 | 132 |
| 78 | 6.0% C–9 | 4.0% N–2 | 8.9 | 134 |
| 79 | 4.6% C–10 | 4.0% N–2 | 9.2 | 150 |
| 80 | 7.0% C–11 | 3.0% N–2 | 6.3 | 155 |
| 81 | 8.0% C–12 | | 6.4 | 142 |
| 82 | 2.75% C–13 | 5.0% N–2 | 9.4 | 165 |
| 83 | 5.0% C–14 | 3.0% N–2 | 9.1 | 138 |
| 84 | 7.0% C–1 | 0.75% N–1 | 9.1 | 140 |
| 85 | 7.0% C–1 | 4.0% N–4 | 9.1 | 136 |
| 86 | 5.0% C–1 | 3.0% N–3 | 9.3 | 150 |

[1] Percent based on latex solids=100.

Other examples of latices adjusted for coagulation temperatures are given in Table VII. In Examples 94, 95 and 96, a small amount of polyvinyl methyl ether has been used. This is a water-soluble heat-sensitive material coagulating at 95° F. in water solution. The small amounts present in the latex compositions effect a slight lowering of the coagulation temperature relative to like compositions without it.

In Table VII, the numerals denote parts by weight with exceptions noted.

In the preferred practice of the invention with commercial anionic latices, a coagulation temperature below a drying range of around 212° F. may be predetermined by adding a controlled amount of CS. Where the coagulation temperature is rapidly lowered by small additions of CS, this may be prevented by first adding a controlled amount of NS.

*Impregnating fabrics.*—A standardized fabric of felted non-woven fibers was used for comparison purposes, consisting of 50% wool and 50% cotton, all condensed to a ¾-inch thick web weighing 84 lbs. per 1000 sq. ft. Pieces of such a web are immersed in an impregnating bath of heat-coagulable latex produced as above described. Excess liquid of the bath is expressed by a controlled operation of squeezing through rubber rolls to leave 10 parts of latex solids per 100 parts of oven-dry weight of the fiber mat.

TABLE VII

| | Example | | | | | | | | | |
|---|---|---|---|---|---|---|---|---|---|---|
| | 87 | 88 | 89 | 90 | 91 | 92 | 93 | 94 | 95 | 96 |
| Latex | 41.6 L-1 | 41.6 L-1 | 41.6 L-1 | 312 L-1 | 312 L-1 | 312 L-1 | 52 L-2 | 456 L-3 | 714 L-4 | 263 L-5. 2,096. |
| Water | 338.4 | 336.9 | 333.9 | 2,162.5 | 2,170 | 2,151 | 323.2 | 842.3 | 2,228 | |
| NS | 6 N-2* | 8 N-2* | 10 N-2* | | | 6 N-2 | 1.125 N-1 | 8.4 N-2* | | 9.36 C-12. |
| CS | 14 C-1* | 9.5 C-10* | 5.5 C-13* | 12 C-12 | 9 C-2 | 10.5 C-1 | 14 C-2* | 11 C-12 | 23.7 C-12 | 3.2. e |
| Buffer | | 4 borax | 4 borax | 12 a | 2.5 e | 25 borax | 1 e | 7.7 e | 22 e | |
| Buffer | | | | 1 b | | | | | | |
| Other | | | | | | | 1.38 d | 15 e | 12.3 f | 15. f 8.35. |
| pH | 9.1 | 9.2 | 9.4 | 6.4 | 6.2 | 9.1 | 6.0 | 5.5 | 6.35 | 176. |
| CT, °F | 140 | 130 | 165 | 142 | 166 | 140 | 164 | 120 | 86 | |

* Ml., diluted 1 to 9.
a Mono ammonium phosphate.
b Ml. of 85% phosphoric acid.
c Ml. of 37% hydrochloric acid.
d Zinc oxide paste, 58% solids.
e Gm. 20% polyvinyl methyl ether, 80% water.
f Gm. 25% polyvinyl methyl ether, 75% water.

Then each wet impregnated mat was subjected to a saturated vapor atmosphere at 190° F. for one minute to effect coagulation of the latex. Then the resulting mat was dried at 250° F. for 20 minutes. Table VIII gives the description and properties of the various products.

In Table VIII, the columns designate data as follows:
Column 1: Fabric No. —. (Fabric No. $x$ made with latex of Example $x$.)
Column 2: Wetting time in seconds for a one-gram piece of the web immersed in the bath.
Column 3: Weight per 1000 sq. ft.
Column 4: Free thickness in inches.
Column 5:: Tensile strength of 1-inch width.
Column 6: Stretch is percent elongation before break.
Column 7: Adhesion is pull in grams on a 2-inch wide strip, to extend a hand split at the center between faces.
Column 8: Free stiffness in inches is the unsupported length of horizontal projection before bending occurs.
Column 9: Hand is a measure by the J & J Handle-O-Meter, the lower the value the softer the "hand."

TABLE VIII

| 1 Fabric No. | 2 Wetting Time | 3 Weight | 4 Free Thickness | 5 Tensile Strength | 6 Stretch | 7 Adhesion | 8 Free Stiffness | 9 Hand |
|---|---|---|---|---|---|---|---|---|
| 29 | | 75 | 0.204 | 1.3 | 18.6 | 70 | 10.4 | |
| 30 | | 79 | 0.201 | 1.5 | 18.0 | 65 | 7.9 | |
| 33 | | 79 | 0.220 | 2.1 | 16.8 | 75 | 10.6 | |
| 34 | | 79 | 0.210 | 2.6 | 16.8 | 110 | 10.0 | |
| 46 | | 78 | 0.193 | 2.0 | 20.0 | 110 | 8.3 | |
| 70 | | 95 | 0.177 | 1.3 | 22.0 | 83 | 10.6 | 63 |
| 71 | | 89 | 0.160 | 2.0 | 26.4 | 167 | 10.9 | 79 |
| 72 | 10 | 93 | 0.159 | 1.9 | 26.2 | 140 | 10.7 | 73 |
| 73 | | 88 | 0.158 | 1.8 | 24.3 | 120 | 11.2 | 60 |
| 74 | 11.2 | 92 | 0.161 | 5.1 | 15.1 | 225 | 10.5 | 136 |
| 75 | | 90 | 0.142 | 3.5 | 19.1 | 237 | 11.6 | 92 |
| 76 | | 81 | 0.147 | 2.7 | 20.4 | 160 | 10.9 | 70 |
| 77 | | 90 | 0.156 | 4.0 | 16.6 | 133 | 11.8 | 85 |
| 78 | 21 | 96 | 0.188 | 2.6 | 22.3 | 225 | 9.0 | 101 |
| 79 | | 86 | 0.150 | 1.5 | 23.1 | 133 | 10.7 | 57 |
| 80 | 12 | 91 | 0.163 | 4.0 | 20.7 | 225 | 8.9 | 115 |
| 81 | 6 | 91 | 0.155 | 2.8 | 20.1 | 140 | 11.7 | 100 |
| 82 | 105 | 94 | 0.157 | 3.0 | 20.0 | 140 | 10.8 | 76 |
| 83 | 108 | 91 | 0.147 | 3.1 | 19.1 | 210 | 11.4 | 95 |

The above tabulation shows that the properties of the bonded mats with a particular initial and a fixed content of a given latex (L-1), may be varied by stabilizing agents and other ingredients.

Reference is made to the cofiled application of Videen and Johnson, Serial No. 606,700, having the same disclosure as given herein. The applicants thereof discovered that the coagulation point may be progressively lowered in active ionic latex dispersions by adding increments of an opposite ionic surfactant.

The applicants of the present application discovered that the ionic character of a latex having an ionic surfactant may be reversed by addition of an opposite ionic surfactant, providing the coagulation temperature is not encountered in so doing. They also have discovered that in the presence of a stabilizing quantity of nonionic surfactant an active ionic latex dispersion containing active ionic surfactant and having an electric charge on the dispersed particles, can be more gradually modified in adding an opposite active ionic surfactant to lower the coagulation temperature to nullify the electric charge; and that addition beyond said point becomes effective to reverse the charge and elevate the coagulation temperature. The actions to neutralize and to reverse the charge are claimed in the present application.

The action to neutralize a part of the active ionic surfactant without neutralizing or reversing the charge is claimed in said cofiled application of Videen and Johnson.

We claim:
1. The method comprising neutralizing a portion of the ionic surfactant dissolved in a correspondingly ionically active aqueous latex dispersion of rubbery film-forming solids which is resistant to coagulation at below a predetermined temperature and which is stabilized against such coagulation by the presence of nonionic surfactant and said ionic surfactant, said neutralizing being effected by adding ionic surfactant of the opposite ionic type, the amount of added neutralizing surfactant being less than the quantity thereof which counteracts the stabilizing contribution of said first-mentioned ionic surfactant, whereby to render the resulting dispersion coagulable by heat at below said predetermined temperature, increased amounts of said neutralizing surfactant being effective to lower the temperature at which coagulation is effected.

2. The method of claim 1 in which the neutralizing ionic surfactant is cationic and the said dissolved surfactant of the latex dispersion is anionic.

3. The method comprising neutralizing a portion of the ionic surfactant dissolved in a correspondingly ionically active aqueous latex dispersion of rubbery film-forming solids which is resistant to coagulation at below a predetermined temperature and which is stabilized against such coagulation by the presence of nonionic surfactant and said ionic surfactant, said neutralizing being effected by adding ionic surfactant of the opposite ionic type, the amount of added neutralizing surfactant being not over the quantity thereof which counteracts the stabilizing contribution of said first-mentioned ionic surfactant, whereby to render the resulting dispersion coagulable by heat at below said predetermined temperature, increased amounts of said neutralizing surfactant being effective to lower the temperature at which coagulation is effected.

4. The method of claim 3 in which the neutralizing ionic surfactant is cationic and the said dissolved surfactant of the latex dispersion is anionic.

5. The method comprising neutralizing substantially all of the ionic surfactant dissolved in a correspondingly ionically active aqueous latex dispersion of rubbery film-forming solids which is resistant to coagulation at below a predetermined temperature and which is stabilized against such coagulation by the presence of nonionic surfactant and said ionic surfactant, said neutralizing being effected by adding ionic surfactant of the opposite ionic type, the amount of added neutralizing surfactant being substantially that quantity thereof which counteracts the stabilizing contribution of said first-mention ionic surfactant, the quantity of nonionic surfactant present being sufficient to prevent coagulation of latex particles when all of said first-mentioned ionic surfactant is neutralized, whereby after said neutralization the resulting dispersion is coagulable by heat at a minimum temperature below said predetermined temperature.

6. The method of claim 5 in which the neutralizing ionic surfactant is cationic and the said dissolved surfactant of the latex dispersion is anionic.

7. The method comprising neutralizing all of the ionic surfactant dissolved in a correspondingly ionically active aqueous latex dispersion of rubbery film-forming solids which is resistant to coagulation at below a predetermined temperature and which is stabilized against such coagulation by the presence of nonionic surfactant and said ionic surfactant, said neutralizing being effected by adding ionic surfactant of the opposite ionic type, the amount of added neutralizing surfactant being in excess of the quantity thereof which counteracts the stabilizing contribution of said first-mentioned ionic surfactant, whereby to reverse the original electric charge on the latex particles, increased amounts of said nonionic surfactant being effective to elevate the minimum coagulation temperature when said two opposite ionic surfactants are present in mutually neutralizing quantities, and increased amounts of said excess of neutralizing surfactant being effective to raise from said minimum the temperature at which coagulation is effected.

8. The method comprising neutralizing all of the anionic surfactant dissolved in a correspondingly ionically active aqueous latex dispersion of rubbery film-forming solids which is resistant to coagulation at below a predetermined temperature and which is stabilized against such coagulation by the presence of nonionic surfactant and said anionic surfactant, said neutralizing being effected by adding cationic surfactant, the amount of added neutralizing cationic surfactant being in excess of the quantity thereof which counteracts the stabilizing contribution of said anionic surfactant, the amount of nonionic surfactant present being sufficient to prevent coagulation of latex particles when all of said anionic surfactant is neutralized and said amount predetermining the minimum coagulation-temperature, whereby after neutralization the latex is charged from anionic to cationic activity, increased amounts of said excess of neutralizing cationic surfactant being effective to raise from said minimum the temperature at which coagulation is effected.

9. The method comprising adding nonionic surfactant to an aqueous latex dispersion of rubbery film-forming solids which is resistant to coagulation at below a predetermined temperature and which is stabilized against such coagulation by the presence of ionic surfactant dissolved therein, and then neutralizing a portion of said ionic surfactant by adding ionic surfactant of the opposite ionic type in amount less than the quantity thereof which counteracts the stabilizing contribution of said first-mentioned ionic surfactant, the combined effect of said added nonionic surfactant and of the unneutralized portion of said first-mentioned ionic surfactant predetermining a new coagulation temperature, increased amounts of said neutralizing ionic surfactant being effective to lower the temperature at which coagulation takes place, and increased amounts of said ionic surfactant being effective to elevate the minimum temperature of coagulation.

10. The method of claim 9 in which the neutralizing ionic surfactant is cationic and the said dissolved ionic surfactant of the latex dispersion is anionic.

11. The method comprising adding nonionic surfactant to an aqueous latex dispersion of rubbery film-forming solids which is resistant to coagulation at below a predetermined temperature and which is stabilized against such coagulation by the presence of ionic surfactant dissolved therein, and then neutralizing at least some of said ionic surfactant by adding ionic surfactant of the opposite ionic type in amount not over the quantity thereof which counteracts the stabilizing contribution of said first-mentioned ionic surfactant, the combined effect of said added nonionic surfactant and of any unneutralized portion of said first-mentioned ionic surfactant predetermining a new coagulation-temperature, whereby to render the resulting dispersion coagulable by heat at below said predetermined temperature, increased amounts of said neutralizing ionic surfactant being effective to lower the temperature at which coagulation takes place, and increased amounts of said ionic surfactant being effective to elevate the minimum temperature of coagulation.

12. The method of claim 11 in which the neutralizing ionic surfactant is cationic and the said dissolved ionic surfactant of the latex dispersion is anionic.

13. The method comprising adding nonionic surfactant to an aqueous latex dispersion of rubbery film-forming solids which is resistant to coagulation at below a predetermined temperature and which is stabilized against such coagulation by the presence of ionic surfactant dissolved therein, and then neutralizing substantially all of said ionic surfactant by adding ionic surfactant of the opposite ionic type in amount which is substantially the quantity thereof which counteracts the stabilizing contribution of said first-mentioned ionic surfactant, the amount of said nonionic surfactant being sufficient to stabilize the dispersion when the two opposite types of ionic surfactants mutually neutralize each other.

14. The method of claim 13 in which the neutralizing ionic surfactant is cationic and the said dissolved ionic surfactant of the latex dispersion is anionic.

15. The method comprising adding nonionic surfactant to an aqueous latex dispersion of rubbery film-forming solids which is resistant to coagulation at below a predetermined temperature and which is stabilized against such coagulation by the presence of ionic surfactant dissolved therein, and then neutralizing all of said ionic surfactant by adding ionic surfactant of the opposite ionic type in amount in excess of the quantity thereof which counteracts the stabilizing contribution of said first-mentioned ionic surfactant, whereby to reverse the original electric charge on the latex particles, increased amounts of said nonionic surfactant being effective to elevate the minimum coagulation temperature when said two opposite ionic surfactants are present in mutually neutralizing quantities, and increased amounts of said excess of neutralizing ionic surfactant being effective to raise from said minimum the temperature at which coagulation takes place.

16. The method comprising adding nonionic surfactant to an aqueous latex dispersion of rubbery film-forming solids which is resistant to coagulation at below a predetermined temperature and which is stabilized against such coagulation by the presence of anionic surfactant dissolved therein, and then adding neutralizing cationic surfactant in excess of the quantity thereof which counteracts the stabilizing contribution of said anionic surfactant, whereby to change the latex from anionic to cationic activity, increased amounts of said nonionic surfactant being effective to elevate the minimum coagulation temperature when said two opposite ionic surfactants are present in mutually neutralizing quantities, and increased amounts of said excess of neutralizing cationic surfactant being effective to raise from said minimum the temperature at which coagulation takes place.

17. An aqueous dispersion of rubbery film-forming solids having ionic activity of ionic surfactant material and containing active ionic surfactant, nonionic surfactant and an inactive combination of anionic surfactant and cationic surfactant, and characterized by coagulability at below the atmospheric boiling point of water.

18. The method which comprises impregnating a porous body with aqueous dispersion non-substantive to the body and according to claim 17, coagulating the latex in the body by subjecting the impregnated body to a temperature below the atmospheric boiling point of water, and thereafter drying the resulting body.

19. The method of claim 18 in which the drying is effected by exposure to a temperature above the boiling point of the water in the body.

20. An aqueous dispersion of rubbery film-forming solids having anionic activity of anionic surfactant material and containing active anionic surfactant, nonionic surfactant and an inactive combination of anionic surfactant and cationic surfactant, and characterized by coagulability at a temperature below the atmospheric boiling point of water.

21. The method which comprises impregnating a porous body with aqueous dispersion non-substantive to the body and according to claim 20, coagulating the latex in the body by subjecting the impregnated body to a temperature below the atmospheric boiling point of water, and thereafter drying the resulting body.

22. The method of claim 21 in which the drying is effected by exposure to a temperature above the boiling point of the water in the body.

23. An aqueous dispersion of rubbery film-forming solids having cationic activity of cationic surfactant material and containing active cationic surfactant, nonionic surfactant and an inactive combination of anionic surfactant and cationic surfactant, and characterized by coagulability at a temperature below the atmospheric boiling point of water.

24. The method which comprises impregnating a porous body with aqueous dispersion non-substantive to the body and according to claim 23, coagulating the latex in the body by subjecting the impregnated body to a temperature below the atmospheric boiling point of water, and thereafter drying the resulting body.

25. The method of claim 24 in which the drying is effected by exposure to a temperature above the boiling point of the water in the body.

26. An aqueous dispersion of rubbery film-forming solids having substantially no ionic activity and containing nonionic surfactant and an inactive combination of anionic surfactant and cationic surfactant, and characterized by coagulability at below the atmospheric boiling point of water.

27. The method which comprises impregnating a porous body with aqueous dispersion non-substantive to the body and according to claim 26, coagulating the latex in the body by subjecting the impregnated body to a temperature below the atmospheric boiling point of water, and thereafter drying the resulting body.

28. The method of claim 27 in which the drying is effected by exposure to a temperature above the boiling point of the water in the body.

References Cited in the file of this patent

UNITED STATES PATENTS

| 2,097,416 | Neiley | Oct. 26, 1937 |
| 2,375,261 | Taylor et al. | May 8, 1945 |
| 2,401,027 | Tausch | May 28, 1946 |
| 2,468,086 | Latham et al. | Apr. 26, 1949 |
| 2,656,327 | Van Wirt et al. | Oct. 20, 1953 |
| 2,686,121 | Latham et al. | Aug. 10, 1954 |
| 2,822,341 | Miller | Feb. 4, 1958 |

OTHER REFERENCES

"Surface Acting Agents," Young and Coons, published by Chemical Publishing Co., Inc. (Brooklyn, N.Y. pages 274–285 relied on).